US010386620B2

(12) United States Patent
Astratov et al.

(10) Patent No.: US 10,386,620 B2
(45) Date of Patent: *Aug. 20, 2019

(54) METHODS AND SYSTEMS FOR SUPER-RESOLUTION OPTICAL IMAGING USING HIGH-INDEX OF REFRACTION MICROSPHERES AND MICROCYLINDERS

(71) Applicant: University of North Carolina at Charlotte, Charlotte, NC (US)

(72) Inventors: Vasily N. Astratov, Charlotte, NC (US); Arash Darafsheh, Charlotte, NC (US)

(73) Assignee: University of North Carolina at Charlotte, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/654,360

(22) Filed: Jul. 19, 2017

(65) Prior Publication Data
US 2018/0196243 A1    Jul. 12, 2018

Related U.S. Application Data

(63) Continuation of application No. 14/042,834, filed on Oct. 1, 2013, now Pat. No. 9,726,874, which is a
(Continued)

(51) Int. Cl.
*G02B 21/00* (2006.01)
*G02B 1/00* (2006.01)
(Continued)

(52) U.S. Cl.
CPC .............. *G02B 21/00* (2013.01); *G02B 1/002* (2013.01); *G02B 21/365* (2013.01); *G02B 27/58* (2013.01)

(58) Field of Classification Search
CPC .... G02B 21/24; G02B 21/00; G02B 21/0044; G02B 21/0032; G02B 21/0076
(Continued)

(56) References Cited

U.S. PATENT DOCUMENTS 7,057,832 B2    6/2006    Wu et al.
7,403,338 B2    7/2008    Wu et al.
(Continued)

FOREIGN PATENT DOCUMENTS

CN    102305776 A    1/2012
EP       1271224 A1    1/2003
(Continued)

OTHER PUBLICATIONS

Microsphere based microscope with optical super-resolution capability; Xiang Hao, Cuifang Kuang, Xu Liu,aJ Haijun Zhang, and Yanghui Li; Appued Physics Lettehs 99, 203102 (2011), 2011 American Institute of Physics.*
(Continued)

*Primary Examiner* — Stephone B Allen
*Assistant Examiner* — Rahman Abdur
(74) *Attorney, Agent, or Firm* — Clements Bernard Walker PLLC; Christopher L. Bernard

(57) ABSTRACT

The present invention provides super-resolution optical imaging methods and systems, including: providing a sample to be optically imaged; providing a plurality of microstructures disposed substantially adjacent to a surface of the sample to be optically imaged; and providing a material disposed about the plurality of microstructures; wherein the plurality of microstructures have a first index of refraction; and wherein the material disposed about the plurality of microstructures has a second index of refraction that is substantially less than the first index of refraction of the plurality of microstructures. The plurality of microstruc-
(Continued)

tures include one of a plurality of microspheres and a plurality of microcylinders.

20 Claims, 4 Drawing Sheets

Related U.S. Application Data continuation-in-part of application No. 13/909,385, filed on Jun. 4, 2013, now abandoned.

(60) Provisional application No. 61/656,710, filed on Jun. 7, 2012.

(51) Int. Cl.
*G02B 21/36* (2006.01)
*G02B 27/58* (2006.01)

(58) Field of Classification Search
USPC .................................................. 359/368–398
See application file for complete search history.

(56) References Cited

U.S. PATENT DOCUMENTS

| | | |
|---|---|---|
| 7,851,779 B2 | 12/2010 | Chong et al. |
| 8,222,905 B2 | 7/2012 | Weng et al. |
| 8,353,061 B2 | 1/2013 | Sumetsky |
| 2009/0276923 A1 | 11/2009 | Sumetsky |
| 2010/0178712 A1 | 7/2010 | Zhang |
| 2010/0245816 A1 | 9/2010 | Shen et al. |
| 2013/0215515 A1 | 8/2013 | Kinoshita et al. |
| 2014/0268319 A1 | 9/2014 | Gulari et al. |
| 2014/0333998 A1 | 11/2014 | Kohli et al. |

FOREIGN PATENT DOCUMENTS

| | | |
|---|---|---|
| WO | 2009141436 A1 | 11/2009 |
| WO | 2013043818 A1 | 3/2013 |

OTHER PUBLICATIONS

Zengbo Wang et al., Optical virtual imaging at 50 nm lateral resolution with a white-light nanoscope, Nature Communications| 2:218 | DOI: 10.1038/ncomms1211, Published Mar. 1, 2011.*

Darafsheh et al., Optical super-resolution by high-index liquid-immersed microspheres, Applied Physics Letters 101, 141128 (2012).

Hao et al., Far-field super-resolution imaging using near-field illumination by micro-fiber, Applied Physics Letters 102, 013104 (2013).

Darafsheh et al., Comparison Between Microsphere-Assisted and Confocal Microscopies, Transparent Optical Networks (ICTON), 2013 15th International Conference.

Darafsheh et al., Super-Resolution Microscopy by Dielectric Microcylinders, Transparent Optical Networks (ICTON), 2013 15th International Conference.

Ferrand et al., "Direct imaging of photonic nanojets," Optical Society of America, 2008, pp. 6930-6940.

Darafsheh et al., "Super-Resolution Imaging by High-Index Microsheres Immersed in a Liquid," ICTON 2012, pp. 1-3.

Arai et al., "High refractive-index microspheres of optical cavity structure," Applied Physics Letter, vol. 82, No. 19, May 12, 2003, pp. 3173-3175.

Lee et al., "Near-field focusing and magnification through self-assembled nanoscale spherical lenses," Nature, vol. 460, Jul. 23, 2009, pp. 498-501.

Hao et al., "Microsphere based microscope with optical super-resolution capability," Applied Physics Letters, Nov. 14, 2011, pp. 1-3.

Liu, Cheng-Yang, "Superenhanced photonic nanojet by core-shell microcylinders," Physics Letters, 2012, pp. 1-5.

* cited by examiner

METHODS AND SYSTEMS FOR SUPER-RESOLUTION OPTICAL IMAGING USING HIGH-INDEX OF REFRACTION MICROSPHERES AND MICROCYLINDERS

CROSS-REFERENCE TO RELATED APPLICATION(S)

The present patent application/patent is a continuation (CON) of co-pending U.S. patent application Ser. No. 14/042,834, filed on Oct. 1, 2013, and entitled "METHODS AND SYSTEMS FOR SUPER-RESOLUTION OPTICAL IMAGING USING HIGH-INDEX OF REFRACTION MICROSPHERES AND MICROCYLINDERS," which is a continuation-in-part (CIP) of co-pending U.S. patent application Ser. No. 13/909,385, filed on Jun. 4, 2013, and entitled "METHODS OF SUPER-RESOLUTION IMAGING BY HIGH-INDEX MICROSPHERES AND/OR MICROCYLINDERS," which claims the benefit of priority of U.S. Provisional Patent Application No. 61/656,710, filed on Jun. 7, 2012, and entitled "METHODS OF SUPER-RESOLUTION IMAGING BY HIGH-INDEX MICROSPHERES," the contents of all of which are incorporated in full by reference herein.

STATEMENT OF GOVERNMENT SUPPORT

The present invention was made with Government support pursuant to award numbers ARO W911NF-09-1-0450 and NSF ECCS-0824067 by the Army Research Office (ARO) and the National Science Foundation (NSF), respectively. Accordingly, the Government has certain rights in the present invention.

FIELD OF THE INVENTION

The present invention relates generally to optical imaging methods and systems. More specifically, the present invention relates to super-resolution optical imaging methods and systems using high-index of refraction microspheres, microcylinders, and the like.

BACKGROUND OF THE INVENTION

It is well known to those of ordinary skill in the art that the resolution of a far field optical imaging system is limited by the diffraction limit. The diffraction-limited spot size is approximately $\lambda/(2 \times NA)$, where A is the free space wavelength and $NA = n \sin \theta$ is the numerical aperture of the lens used, where n is the refractive index in the object space and $\theta$ is the half-angle subtended. It is also well known to those of ordinary skill in the art that information about the nanoscale (i.e. sub-wavelength) structure of an object being imaged is encoded in its optical near field. However, conventional optical imaging systems, such as lenses, cannot capture these evanescent fields, which decay exponentially in the vicinity of the surface of the object. This is the main reason why conventional far field optical imaging systems have diffraction-limited optical resolutions. A practical system for super-resolution optical imaging must be capable of capturing these near field optical components, and then converting them into propagating modes that can be used for imaging the objects in far field, but with resolution exceeding the diffraction limit. An ideal system for super-resolution optical imaging must also be able to magnify a sub-diffraction limited image. Thus, improved systems for super-resolution optical imaging are still needed in the art.

BRIEF SUMMARY OF THE INVENTION

In various exemplary embodiments, the present invention provides improved methods and systems for the super-resolution optical imaging of nanoscale objects using high-index of refraction microspheres, microcylinders, and the like. For example, the present disclosure defines high-index of refraction microspheres as microspheres with an index of refraction (n) larger than 1.8. Previously, super-resolution optical imaging has typically been explored and demonstrated using microspheres with a relatively low n~1.46-1.50. In accordance with the present invention, the distinctive feature of high-index of refraction microspheres is their ability to provide super-resolution optical imaging in cases where the microspheres are embedded in a material with an index of refraction that is substantially less than that of the microspheres. This is demonstrated for barium titanate glass microspheres with n~1.9-2.1 immersed in isoprapanol with an index of refraction of 1.37, for example. However, such super-resolution optical imaging using high index of refraction microspheres can be achieved using different liquids, polymers, or other transparent or semi-transparent materials for infiltration, as is described in greater detail herein below. Advantageously, this allows for very broad applications in nanoplasmonics, nanophotonics, biomedical microscopy, microfluidics, and for the super-resolution optical imaging of metallic and/or semiconductor nanostructures and/or individual cells, for example, which were not possible using previously developed methods based on the use of low-index of refraction microspheres. The methods and systems for super-resolution optical imaging of the present invention can be realized using microspheres (or microcylinders or the like) with diameters varying from several wavelengths (~1-2 μm in the visible regime) up to thousands of wavelengths. The methods and systems can be realized in at least two exemplary embodiments. In one exemplary embodiment, the high-index of refraction microspheres (or microcylinders or the like) are deposited on the surface of the object being imaged and covered with a liquid or semi-solid. In another exemplary embodiment, the high-index of refraction microspheres (or microcylinders or the like) are embedded in a material with the ability to solidify about them, thereby forming a thin film that can be transferred and attached to the surface of the object being imaged. Both exemplary embodiments otherwise use conventional microscopy tools, such as microscopes, for optically imaging the nanoscale features of the objects being imaged by visualization through the microspheres.

In one exemplary embodiment, the present invention provides a super-resolution optical imaging method, including: providing a sample to be optically imaged; providing a plurality of microstructures disposed substantially adjacent to a surface of the sample to be optically imaged; and providing a material disposed about the plurality of microstructures; wherein the plurality of microstructures have a first index of refraction; and wherein the material disposed about the plurality of microstructures has a second index of refraction that is substantially less than the first index of refraction of the plurality of microstructures. The material disposed about the plurality of microstructures is one of a liquid material, a semi-solid material, and a solid material. The plurality of microstructures include one of a plurality of microspheres and a plurality of microcylinders. Optionally, the plurality of microstructures are disposed substantially adjacent to the surface of the sample to be optically imaged and subsequently the material is disposed about the plurality of microstructures. Alternatively, the plurality of microstructures are disposed substantially adjacent to the surface of the sample to be optically imaged after the material is disposed about the plurality of microstructures (the material may also be disposed adjacent to the surface of the sample to be optically imaged first, then the plurality of microstructures are disposed adjacent to or in the material, etc.). The first index of refraction is equal to or greater than about 1.8. Again, the second index of refraction is less than the first index of refraction. The method also includes optically imaging the sample through the plurality of microstructures and the material disposed about the plurality of microstructures using an objective of a microscope. The plurality of microstructures and the material disposed about the plurality of microstructures are disposed in a near field region of the sample to be optically imaged. The plurality of microstructures have diameters or major dimensions between a wavelength of light utilized to several thousand wavelengths of the light utilized. The plurality of microstructures are made of a glass material, a crystalline material, barium titanate, chalcogenide, titania, zirconium oxide, zinc oxide, silicon, or the like. The material disposed about the plurality of microstructures includes liquids, solids, semisolids, water, isopropanol, alcohols, cyclohexane, toluene, PDMS, gels, polymers, epoxies, or the like. Optionally, the plurality of microstructures and the material disposed about the plurality of microstructures form a transferable component that is selectively disposed substantially adjacent to the surface of the sample to be optically imaged.

In another exemplary embodiment, the present invention provides a super-resolution optical imaging system, including: a plurality of microstructures disposed substantially adjacent to a surface of a sample to be optically imaged; and a material disposed about the plurality of microstructures; wherein the plurality of microstructures have a first index of refraction; and wherein the material disposed about the plurality of microstructures has a second index of refraction that is substantially less than the first index of refraction of the plurality of microstructures. The material disposed about the plurality of microstructures is one of a liquid material, a semi-solid material, and a solid material. The plurality of microstructures include one of a plurality of microspheres and a plurality of microcylinders. Optionally, the plurality of microstructures are disposed substantially adjacent to the surface of the sample to be optically imaged and subsequently the material is disposed about the plurality of microstructures. Alternatively, the plurality of microstructures are disposed substantially adjacent to the surface of the sample to be optically imaged after the material is disposed about the plurality of microstructures. The first index of refraction is equal to or greater than about 1.8. Again, the second index of refraction is less than the first index of refraction. The system also includes an objective of a microscope for optically imaging the sample through the plurality of microstructures and the material disposed about the plurality of microstructures. The plurality of microstructures and the material disposed about the plurality of microstructures are disposed in a near field region of the sample to be optically imaged. The plurality of microstructures have diameters between a wavelength of light utilized to several thousand wavelengths of the light utilized. The plurality of microstructures are made of a glass material, a crystalline material, barium titanate, chalcogenide, titania, zirconium oxide, zinc oxide, silicon, or the like. The material disposed about the plurality of microstructures includes liquids, solids, semisolids, water, isopropanol, alcohols, cyclohexane, toluene, PDMS, gels, polymers, epoxies, or the like. Optionally, the plurality of microstructures and the material disposed about the plurality of microstructures form a transferable component that is selectively disposed substantially adjacent to the surface of the sample to be optically imaged.

In a further exemplary embodiment, the present invention provides a super-resolution optical imaging device, including: a plurality of microstructures; and a material disposed about the plurality of microstructures; wherein the plurality of microstructures have a first index of refraction; wherein the material disposed about the plurality of microstructures has a second index of refraction that is substantially less than the first index of refraction of the plurality of microstructures; and wherein the plurality of microstructures and the material disposed about the plurality of microstructures collectively form a transferable component that is configured to be disposed substantially adjacent to a surface of a sample to be optically imaged.

BRIEF DESCRIPTION OF THE DRAWINGS

The present invention is illustrated and described herein with reference to the various drawings, in which like reference numerals are used to denote like method steps/system components, as appropriate, and in which.

DETAILED DESCRIPTION OF THE INVENTION

Figure 1:
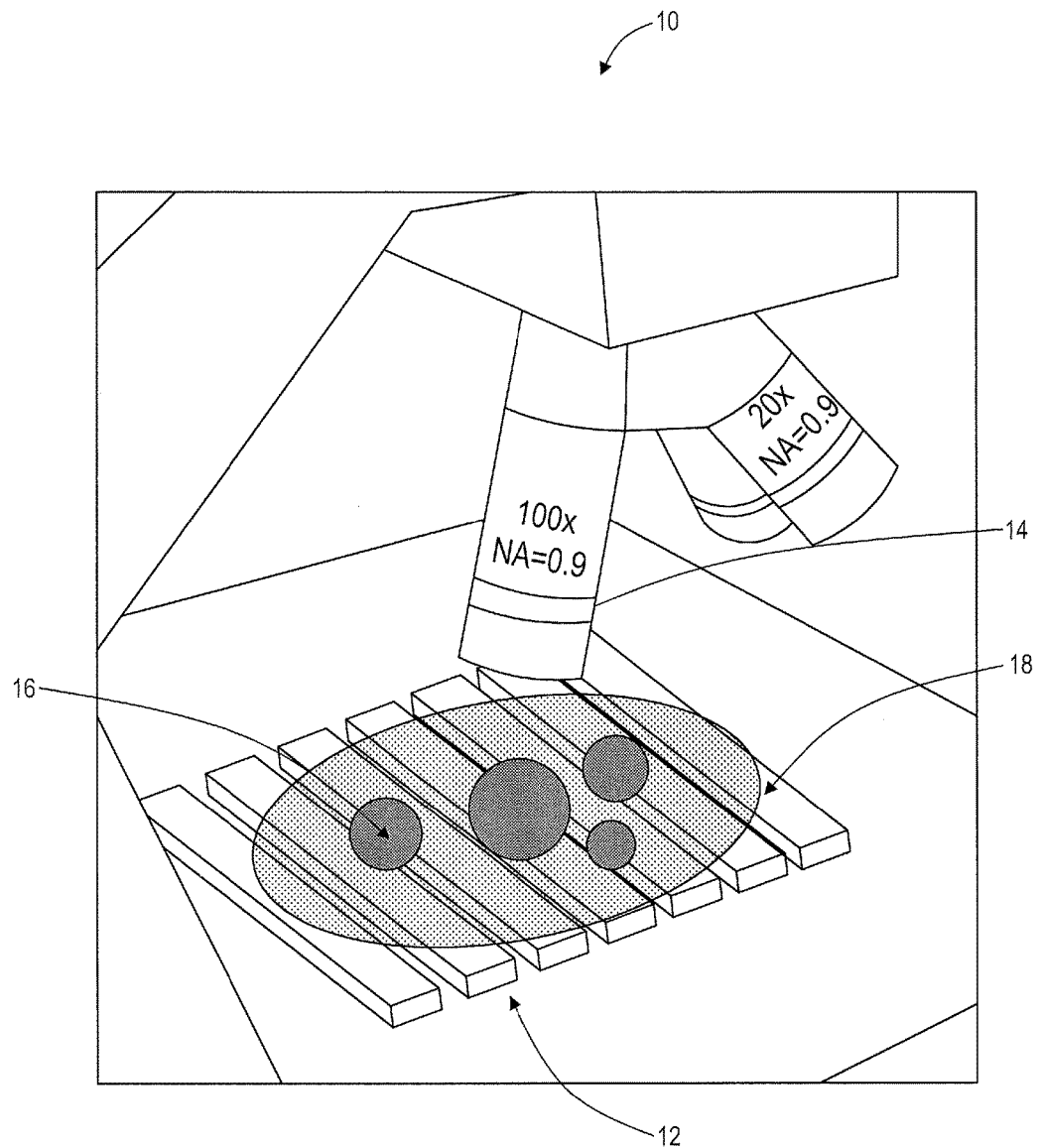
FIG. 1 is a schematic illustrating one exemplary embodiment of the present invention using microspheres disposed on the surface of an object being imaged and submerged in an infiltrating liquid or semi-solid material.

The processes for the collection of near field spatial harmonics and their conversion into propagating fields are typically realized in structures with sophisticated engineering designs. Previously, super-resolution optical imaging has been realized using near field probes, solid immersion lenses (SILs), novel metamaterials, plasmon gratings, and various modified fluorescence-based techniques, such as stimulated emission depletion (STED). These methods and devices, however, have various drawbacks in super-resolution optical imaging applications. Near field probes have low transmissions, they can be easily damaged by contact with a surface, and they require sophisticated and precise positional control. Solid immersion lenses use an immersion lens made from a high-index of refraction material. There are two cuts made in a solid sphere that yield aberration free imaging. If one cuts through the middle of the sphere, the resulting hemispherical lens enhances the numerical aperture of an optical system by n, the index of refraction of the lens material. If one cuts a slice at a distance R+R/n from the top of a sphere of radius R, the resulting lens enhances the numerical aperture by $n^2$. Although SIL technology represents a significant improvement of optical imaging technology, and has allowed the development of optical devices with NA>1, it remains impractical for resolving details under 100 nm. In particular, one of the drawbacks of this technology is that the base of the hemispherical or super-spherical SIL must be placed in a near field vicinity of the object, but there is no convenient way to control (and in many cases even to know) the nanometric separation between the surface of the lens' base and the investigated surface. Commercially, only SILs with large millimeter-scale dimensions are available, due to difficulties associated with manufacturing individual SILs with smaller dimensions. It is, however, rather difficult to control the nanometric separation between millimeter-scale surfaces. Much smaller micron-scale SILs have been fabricated using rather complicated surface treatments; however such micron-scale SILs (sometimes called nano-SILs in the literature) necessarily have a permanently fixed position at the surface of the structure. Due to difficult fabrication and fixed position, such micron-scale SILs have not found wide application. Novel metamaterials and plasmon gratings can operate only in a narrow range of wavelengths and they are very difficult to manufacture. Various modified fluorescence-based techniques, such as STED, are, of course, applicable only to fluorescent materials.

In this context, super-resolution optical imaging using microspheres, microcylinders, or the like provides a simple and superior way of achieving sub-diffraction resolution. In comparison with SILs, the advantage of these microstructures with a circular symmetry is the extremely compact size of their contact region with a surface underneath. In a hard sphere model, the contact region is represented by a single point, whereas for cylinders it is represented by a line. In a real physical situation, the contact region has finite dimensions, but it is significantly smaller than that of SILs. This makes it much easier to make sure that the spheres or cylinders are actually in contact with the investigated surface. This can be achieved, for example, by lightly pressing these microstructures into the investigated surface. The simple geometry of the problem allows for an estimation that, in the vicinity of the contact region, the spherical or cylindrical surface is located within the extent of the evanescent fields produced by various surface nanostructures, which can be used for their super-resolution optical imaging. In this methodology, the surface of an object can be considered as a collection of nanoscale dipole antennas that contain information about its structure in the optical near field. It has been demonstrated that if a microsphere in an air environment with index of refraction (n) around 1.46 and size from 2 to 9 µm is placed in a contact position, its near contact region can convert the high frequency spatial harmonics of the evanescent field into propagating modes. This allows for the super-resolution imaging of these high-frequency components by looking "through the microsphere" into a virtual image produced by such microsphere at a certain depth below the surface of the structure. An additional advantage of this technique is that it can be performed using white light illumination. Both far field resolution between $\lambda/8$ and $\lambda/14$ and magnification between ×4 and ×8.2 have been demonstrated using such white light nanoscopy. In addition, it has been shown that the super-resolution capability of this technique can be reinforced by semi-immersing the corresponding microspheres in a liquid droplet, producing a sharper contrast with a comparatively smaller magnification factor.

Regarding the use of microspheres with different indices of refraction and diameters, it has been shown that there is a certain range of microsphere diameters termed a "super-resolution window" where super-resolution optical imaging becomes possible due to the fact that the geometrical optics become invalid. For microspheres with n=1.46, the super-resolution window is established as 2 µm<diameter<9 µm. The size of the super-resolution window is found to be microsphere index of refraction dependent. Others have argued that, when refractive index increases further to n=2.0, the super-resolution strength reduces and the super-resolution window shrinks, making it undesirable to use n>1.8 high-index of refraction materials for nanoimaging. Thus, the use of high-index of refraction microspheres in these prior studies has been considered undesirable, especially for applications in air environments.

It should be noted that imaging in the presence of a liquid has a great potential for developing applications in biological microscopy, as most cell cultures and other biological samples are primarily liquid. Imaging using semi-immersed microspheres (which has been advanced by others) has proven to be technically complicated due to the dynamic processes associated with a droplet's evaporation, which leads to gradually varying resolution and magnification. Much more stable optical imaging is obtained with the microspheres totally submerged in a liquid, as utilized in the present invention. Others have (wrongly) flatly rejected such approaches.

In the present invention, the combined use of two aspects that have been previously considered as negative for achieving optical super-resolution, i) high index of refraction microstructures and ii) total immersion, actually results in optical super-resolution with superior quality as compared to other known techniques. In various exemplary embodiments, the present invention solves the problem of super-resolution optical imaging in the presence of a medium with a certain index of refraction in which the microspheres are totally embedded. The origin of this problem is connected with the fact that conventional low-index of refraction (n~1.46-1.50) microspheres do not form a sufficiently high refractive index contrast with liquids, polymers, or other materials routinely used in the optical devices. For this reason, total immersion of these microspheres in various materials leads to a weakening of their focusing strength and a loss of their super-resolution capability.

In one exemplary embodiment, the present invention solves problems in the art by using high-index of refraction microspheres, which are defined as microspheres with n above 1.8. In order to realize the full potential of the present invention, even higher index of refraction microspheres are desirable. In one exemplary embodiment, barium titanate glass (BTG) microspheres with an index of refraction in the visible realm of ~1.9-2.1 are used. Such microspheres form a refractive index contrast with ~1.4-1.6 for water or many other liquids with indices of refraction similar to water. In addition, the methods of the present invention can be realized using microspheres with diameters varying from several wavelengths (~1-2 µm in the visible realm) up to thousands of wavelengths. Evidence is provided that BTG microspheres with n~2.1 and diameters of ~50 μm fully immersed in isopropanol (n~1.37) allows a superior resolution of a commercial Blu-ray® disk as compared to low-index of refraction (n~1.5) microspheres with similar diameters in air. The advantage of large microspheres in optical imaging applications, for example, is associated with the very wide field of view provided by such microspheres combined with their super-resolution capability. The choice of microsphere size is a tradeoff between the resolution and the field-of-view—smaller spheres (e.g. micron scale) provide better resolution at the expense of field-of-view.

The idea of using high index of refraction microspheres in combination with total immersion for these applications is nonobvious because the mechanisms of near field optical imaging using microspheres are not totally understood at present. The geometrical optics modeling of the magnification of these systems is mainly based on their refractive index contrast. This geometrical optics approach takes into account a virtual image produced by such microspheres at a certain depth below the surface of the structure. However, a more complete understanding of the super-resolution optical imaging is based on the mechanisms of the capturing of optical near fields by microspheres which are not well studied at the present time.

Figure 2:
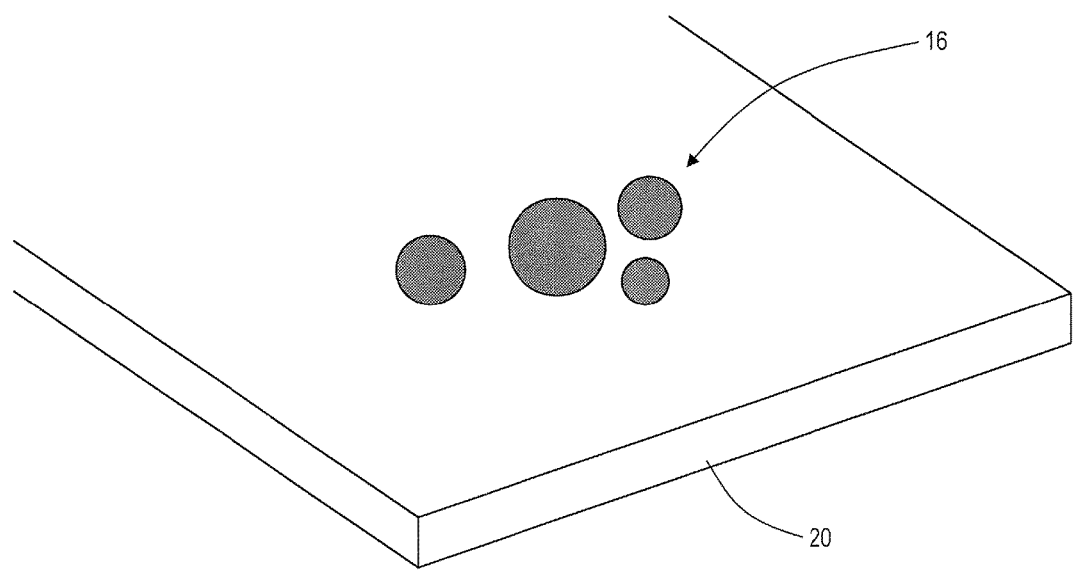
FIG. 2 is a schematic illustrating another exemplary embodiment of the present invention using microspheres disposed within another material having a substantially lower index of refraction, thereby forming a thin film that can be disposed substantially adjacent to an object being imaged.

Referring now specifically to FIGS. 1 and 2, in two exemplary embodiments, the optical imaging setup 10 of the present invention includes a sample 12 with nanoscale surface features under study and a conventional microscope objective 14. In the first exemplary embodiment (FIG. 1), the high-index of refraction microspheres 16 are deposited on the surface of the sample 12 and immersed in a liquid droplet 18. In the second exemplary embodiment (FIG. 2), the high-index of refraction microspheres 16 are embedded in a material 20 with the ability to solidify, such as PDMS, forming a thin film that can be transferred and attached to the surface of the sample.

Figure 3:
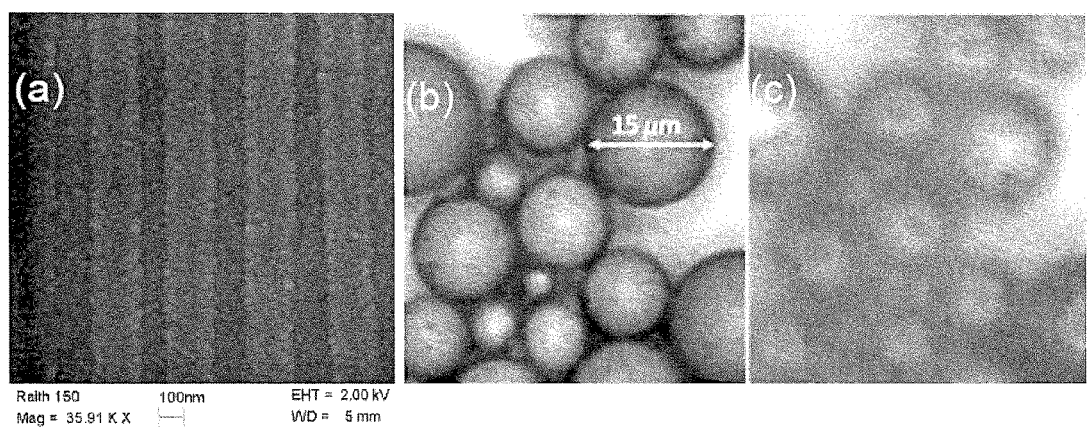
FIG. 3 illustrates (a) a scanning electron microscope (SEM) image of a commercial Blu-ray® disk with 200-nm width stripes separated by 100-nm width grooves, (b) BTG microspheres with diameter sizes ~2-20 μm immersed in isopropanol used to resolve the sub-diffraction features of the sample (a), and (c) imaging with an optical microscope with 20× and NA=0.4 objective lens through the microspheres.

Related to the first exemplary embodiment (FIG. 1), a sample with a one-dimensional surface array was obtained using a commercial Blu-ray® disk with nominal track pitch size of 300 nm, consisting of 200-nm width stripes separated by 100-nm width grooves, as shown in FIG. 3a. The 100-μm-thick transparent protection layer of the disk was peeled off before using the microspheres.

For super-resolution optical imaging, BTG microspheres (n~1.9-2.1) were fully immersed in isopropanol (n~1.37) placed on the surfaces of samples. The microspheres were positioned on the samples either individually using an optical tapered fiber controlled by a hydraulic micromanipulator or in groups using self-assembly in a liquid. The isopropanol was poured on the surfaces of the samples using a micropipette to fully cover the microspheres. Both the Blu-ray® disk and the microspheres had hydrophilic surfaces that resulted in small contact angles and good liquid infiltration.

An FS70 Mitutoyo microscope in reflection illumination mode with 100× (NA=0.9) or 20× (NA=0.4) microscope objectives was used for optical imaging. The white light illumination was provided by a halogen lamp with 600-nm peak wavelength. The 300-nm period of Blu-ray® disk cannot be resolved using conventional microscopy. Use of the microspheres allows a dramatic increase in the resolution. Super-resolution imaging of the Blu-ray® disk without liquid can be achieved using microspheres with a moderate index of refraction, such as borosilicate glass (n~1.47), soda lime glass (n~1.51), polystyrene (n~1.59), or sapphire (n~1.77). However, all of these microspheres are found to lose their imaging capability if they are completely covered with a layer of isopropanol. These results were found to be generally consistent with previous studies performed for silica microspheres with n~1.46. It should be noted that the present invention can utilize a microscope in a reflection mode, a transmission mode, a confocal configuration, a fluorescence configuration, a STED configuration, a saturated pattern excitation microscopy (SPEM) configuration, a saturated structured illumination microscopy (SSIM) configuration, etc.

High index of refraction (n~1.9) BTG spheres showed very different behavior in these experiments. Without liquid infiltration, they did not produce any images. However, they provided super-resolution optical imaging in cases when they were totally covered with a liquid, as illustrated in FIG. 3c. The depth of focusing in FIG. 3c is below the surface of the sample, as can be seen by comparison with the case of near surface focusing presented for the same liquid infiltrated structures in FIG. 3b. It is seen that the far field virtual images of individual 100-nm width grooves (the dark stripes) are resolved in FIG. 3c, which means resolution on the order of $\lambda/6$, well in excess of the Rayleigh resolution limit for the line objects ($r=0.5\lambda/NA$) is demonstrated.

Figure 4:
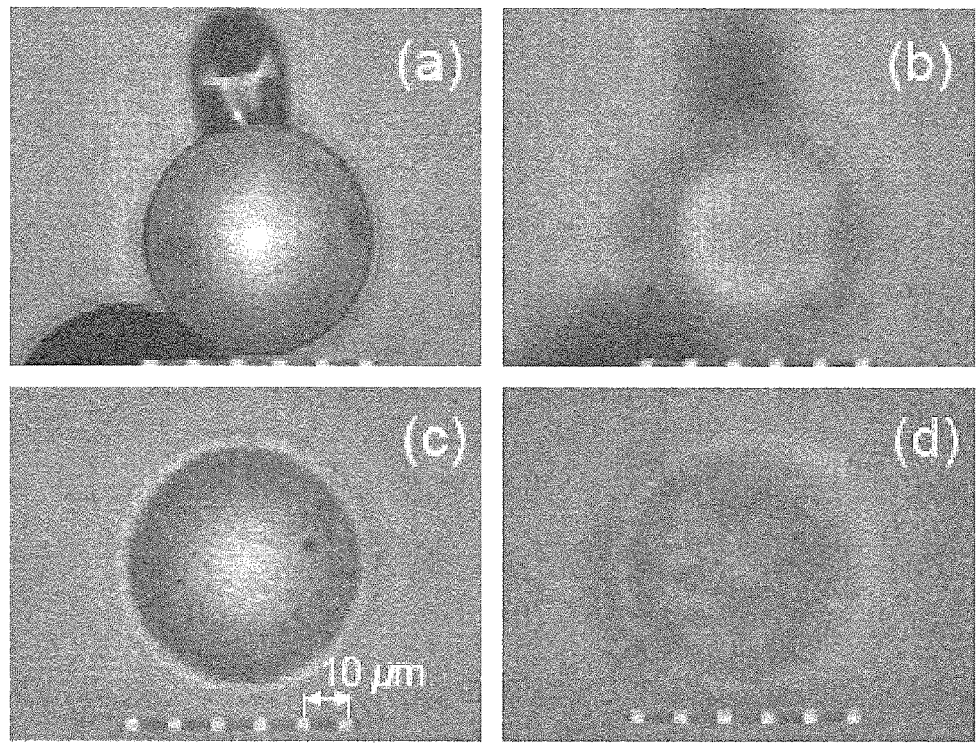
FIG. 4 illustrates (a) a BTG microsphere with a diameter ~50 μm and index of refraction n=2.1 immersed in isopropanol, (b) a corresponding image illustrating sub-diffraction features of a commercial Blu-ray® disk with 200-nm width stripes separated by 100-nm width grooves, (c) a soda-lime glass microsphere with a diameter ~50 μm and index of refraction n=1.51 in air, and (d) a corresponding image illustrating very poorly resolved sub-diffraction features of the same Blu-ray® disk with a weak contrast and poor image quality.

The super-resolution capability of BTG microspheres depends on their diameters. A comparison of FIGS. 3b and 3c shows that all spheres with diameter sizes ~2-20 μm and index of refraction ~1.9 immersed in isopropanol allowed the resolution of the sub-diffraction features of the sample. Similar optical imaging using a 50-μm BTG microsphere with index of refraction ~2.1 immersed in isopropanol was performed, as shown in FIG. 4a. The virtual image of the Blu-ray® disk through such a microsphere shows the sub-diffraction features of the sample with extremely high quality and contrast, as illustrated in FIG. 4b. These results were compared with the optical images obtained in air using the soda-lime microspheres with 50-μm size and an index of refraction ~1.51, as illustrated in FIGS. 4c and 4d. It should be noted that the refractive index contrasts of the BTG spheres in isopropanol (~1.53) and soda-lime spheres in air (~1.51) are very close. Although in terms of the geometrical optics these two cases are very similar, the difference in quality of these images is obvious. The quality of optical imaging by the totally liquid immersed high-index of refraction BTG microspheres was found to be far superior as compared to the soda-lime microspheres in air, which can be seen by comparing the resolution, quality, and contrast of the images in FIGS. 4b and 4d. This can be explained by the shorter wavelength of light in the liquid as compared to an air case. The image in FIG. 4b shows that by using large microspheres, the super-resolution can be achieved in a wide field-of-view in excess of tenths of microns. Although the resolution provided by the large microspheres (such as 50-μm size and larger) is somewhat reduced as compared to the wavelength scale microspheres, it is still sufficiently high for many applications. This is a very important property for practical applications of the present invention because it reduces the requirements for the precise positioning of microspheres in these methods.

It should be noted that there are many contemplated technologies for obtaining the structures of the present invention. The simplest example is based on the deposition of high-index or refraction microspheres followed by liquid infiltration, as described herein above. In order to visualize larger areas of the sample, however, a microsphere can be attached to a micromanipulator and scanned along the surface of the sample. Such microstructures can also be obtained using a semiconductor technology. As an example, the following sequence of technological steps can be used: i) deposition of microspheres made from a sacrificial material that can be evaporated or removed via temperature treatment or etching, ii) overgrowth or layer deposition using the material with the second, lower index of refraction, iii) removing the sacrificial material, and iv) infiltration of the spherical or cylindrical voids with the material with the first, higher index of refraction.

The key feature of one exemplary embodiment (FIG. 2) of the present invention, described herein above, is that one can embed the microspheres (or microcylinders or the like) inside a thin film that has the ability to solidify and that can be applied to a surface under study as a transferable optical component. This is distinguished from other exemplary embodiments described herein above in that instead of positioning microspheres (or microcylinders or the like) individually, one can apply the transferable optical component, a thin film with embedded microspheres, to the surface under study. In order to simplify optical observation and to enable a controllable shift of such thin film, its surface can be lubricated with an index matching (or otherwise) liquid or gel. The exact positioning of the microspheres relative to the surface under study is achieved by precise lateral shifting of the thin film along the lubricated surface. Again, the material of the thin film containing the plurality of microstructures is one of a plastic material, a gel material with an ability to solidify, a polymer or photopolymer material with the ability to solidify, an epoxy material, a semisolid material, a solid material, etc. The thin film with embedded microstructures is applied to the surface under study and carefully positioned using, for example, lubrication and very careful transverse shifts to align different embedded microstructures with the surface under study. One condition is that the thin film is located so close to the surface under study that the embedded microstructures are located in a near field region of the surface under study. To this end, the thin film may be slightly pressed into the surface under study.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A super-resolution optical imaging method, comprising:
    providing a sample to be optically imaged;
    disposing a plurality of microstructures adjacent to a surface of the sample to be optically imaged; and
    disposing a liquid, semi-solid, or solid material fully about and encompassing the plurality of microstructures;
    wherein the plurality of microstructures have a first index of refraction equal to or greater than 1.8 at a given temperature and wavelength; and
    wherein the material disposed fully about and encompassing the plurality of microstructures has a second index of refraction at the given temperature and wavelength that is less than the first index of refraction of the plurality of microstructures.

2. The super-resolution optical imaging method of claim 1, wherein the plurality of microstructures comprise one of a plurality of microspheres and a plurality of microcylinders.

3. The super-resolution optical imaging method of claim 1, wherein the plurality of microstructures are disposed adjacent to the surface of the sample to be optically imaged and subsequently the material is disposed about the plurality of microstructures.

4. The super-resolution optical imaging method of claim 1, wherein the plurality of microstructures are disposed adjacent to the surface of the sample to be optically imaged after the material is disposed about the plurality of microstructures.

5. The super-resolution optical imaging method of claim 1, wherein the second index of refraction is less than 1.8.

6. The super-resolution optical imaging method of claim 1, further comprising optically imaging the sample through the plurality of microstructures and the material disposed about the plurality of microstructures.

7. The super-resolution optical imaging method of claim 1, wherein the plurality of microstructures have diameters between a wavelength of light utilized to 1.5 thousand wavelengths of the light utilized.

8. The super-resolution optical imaging method of claim 1, wherein the plurality of microstructures are made of one or more of a glass material, a crystalline material, barium titanate, chalcogenide, titania, zirconium oxide, zinc oxide, and silicon.

9. The super-resolution optical imaging method of claim 1, wherein the material disposed about the plurality of microstructures comprises one or more of water, isopropanol, an alcohol, cyclohexane, toluene, PDMS, a gel, a polymer, and an epoxy.

10. The super-resolution optical imaging method of claim 1, wherein the plurality of microstructures and the material disposed about the plurality of microstructures form a transferable component that is selectively disposed adjacent to the surface of the sample to be optically imaged.

11. A super-resolution optical imaging system, comprising:
    a plurality of microstructures disposed adjacent to a surface of a sample to be optically imaged; and
    a liquid, semi-solid, or solid material disposed fully about and encompassing the plurality of microstructures;
    wherein the plurality of microstructures have a first index of refraction equal to or greater than 1.8 at a given temperature and wavelength; and
    wherein the material disposed fully about and encompassing the plurality of microstructures has a second index of refraction at the given temperature and wavelength that is less than the first index of refraction of the plurality of microstructures.

12. The super-resolution optical imaging system of claim 11, wherein the plurality of microstructures comprise one of a plurality of microspheres and a plurality of microcylinders.

13. The super-resolution optical imaging system of claim 11, wherein the plurality of microstructures are disposed adjacent to the surface of the sample to be optically imaged and subsequently the material is disposed about the plurality of microstructures.

14. The super-resolution optical imaging system of claim 11, wherein the plurality of microstructures are disposed adjacent to the surface of the sample to be optically imaged after the material is disposed about the plurality of microstructures.

15. The super-resolution optical imaging system of claim 11, wherein the second index of refraction is less than 1.8.

16. The super-resolution optical imaging system of claim 11, further comprising an optical imaging device for optically imaging the sample through the plurality of microstructures and the material disposed about the plurality of microstructures.

17. The super-resolution optical imaging system of claim 11, wherein the plurality of microstructures have diameters between a wavelength of light utilized to 1.5 thousand wavelengths of the light utilized.

18. The super-resolution optical imaging system of claim 11, wherein the plurality of microstructures are made of one or more of a glass material, a crystalline material, barium titanate, chalcogenide, titania, zirconium oxide, zinc oxide, and silicon.

19. The super-resolution optical imaging system of claim 11, wherein the material disposed about the plurality of microstructures comprises one or more of water, isopropanol, an alcohol, cyclohexane, toluene, PDMS, a gel, a polymer, and an epoxy.

20. The super-resolution optical imaging system of claim 11, wherein the plurality of microstructures and the material disposed about the plurality of microstructures form a transferable component that is selectively disposed adjacent to the surface of the sample to be optically imaged.

\* \* \* \* \*